United States Patent
Kaneko et al.

(10) Patent No.: US 8,101,815 B2
(45) Date of Patent: Jan. 24, 2012

(54) PET WASTE ABSORPTION SHEET

(75) Inventors: Shinya Kaneko, Shinagawa-ku (JP); Takeshi Ikegami, Shinagawa-ku (JP)

(73) Assignee: Uni-Charm Corporation, Ehime (JP)

( * ) Notice: Subject to any disclaimer, the term of this patent is extended or adjusted under 35 U.S.C. 154(b) by 314 days.

(21) Appl. No.: 11/357,540

(22) Filed: Feb. 17, 2006

(65) Prior Publication Data
US 2006/0200104 A1 Sep. 7, 2006

(30) Foreign Application Priority Data
Mar. 1, 2005 (JP) ................................. 2005-056423

(51) Int. Cl.
*A61F 13/15* (2006.01)

(52) U.S. Cl. .................... 604/383; 604/365; 119/169

(58) Field of Classification Search .............. 604/383, 604/365; 119/169
See application file for complete search history.

(56) References Cited

U.S. PATENT DOCUMENTS

| | | | |
|---|---|---|---|
| 4,735,843 A * | 4/1988 | Noda | 428/137 |
| 4,800,677 A * | 1/1989 | Mack | 119/171 |
| 5,269,775 A * | 12/1993 | Freeland et al. | 604/385.22 |
| 5,334,176 A * | 8/1994 | Buenger et al. | 604/367 |
| 5,342,334 A * | 8/1994 | Thompson et al. | 604/366 |
| 5,630,376 A * | 5/1997 | Ochi et al. | 119/169 |
| 5,797,347 A * | 8/1998 | Ochi | 119/169 |
| 6,025,535 A * | 2/2000 | Octavio et al. | 604/381 |
| 6,127,595 A * | 10/2000 | Makoui et al. | 604/367 |
| 6,274,218 B1 * | 8/2001 | Shimizu | 428/137 |
| 2002/0115969 A1 | 8/2002 | Maeda et al. | |

FOREIGN PATENT DOCUMENTS

| | | |
|---|---|---|
| JP | 3-114947 | 11/1991 |
| JP | 05-039258 U | 5/1993 |
| JP | 09-187183 A | 7/1997 |
| JP | 11-332413 A | 12/1999 |
| JP | 2001-008568 A | 1/2001 |
| JP | 2001-352852 | 12/2001 |
| JP | 2003-092940 A | 4/2003 |
| JP | 2004-049233 A | 2/2004 |
| JP | 2004-187597 A | 7/2004 |
| JP | 2004-242516 A | 9/2004 |
| JP | 2004-313580 | 11/2004 |
| WO | WO 01/89439 A1 | 11/2001 |

OTHER PUBLICATIONS

Japanese Office Action from corresponding Japanese Application No. 2005-56423 with English translation, dated May 18, 2010, 4 pages.

* cited by examiner

*Primary Examiner* — Lynne Anderson

(74) *Attorney, Agent, or Firm* — Brinks Hofer Gilson & Lione

(57) ABSTRACT

A pet waste absorption sheet includes a liquid-impermeable backsheet, a liquid-permeable topsheet, and an absorbent core disposed between the backsheet and the topsheet. The topsheet is a resin film formed with a plurality of apertures for passage of liquid. The topsheet is bonded to the absorbent core through a hot-melt type adhesive. The hot-melt type adhesive is applied in a plurality of continuous lines including curved portions.

6 Claims, 6 Drawing Sheets

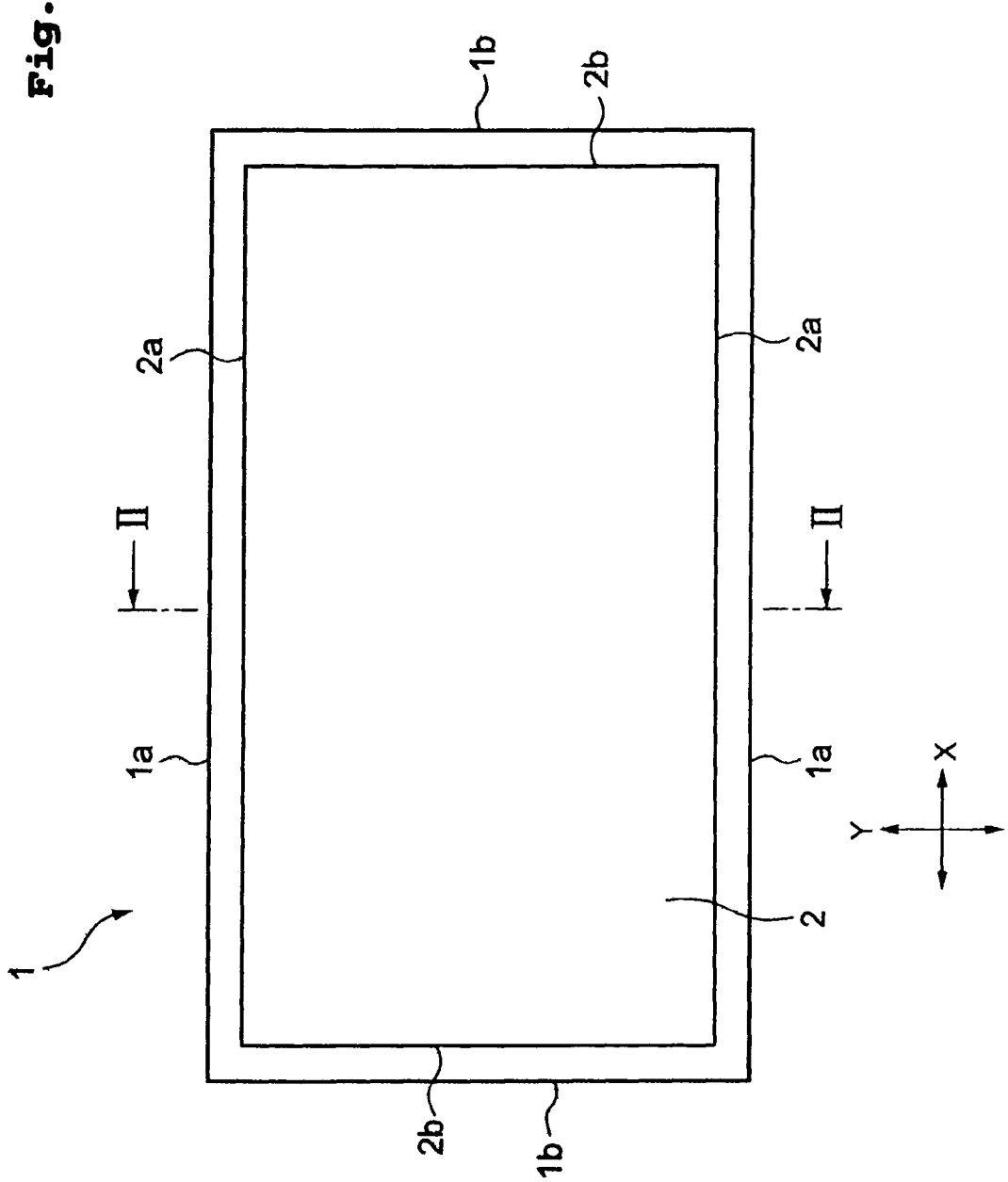

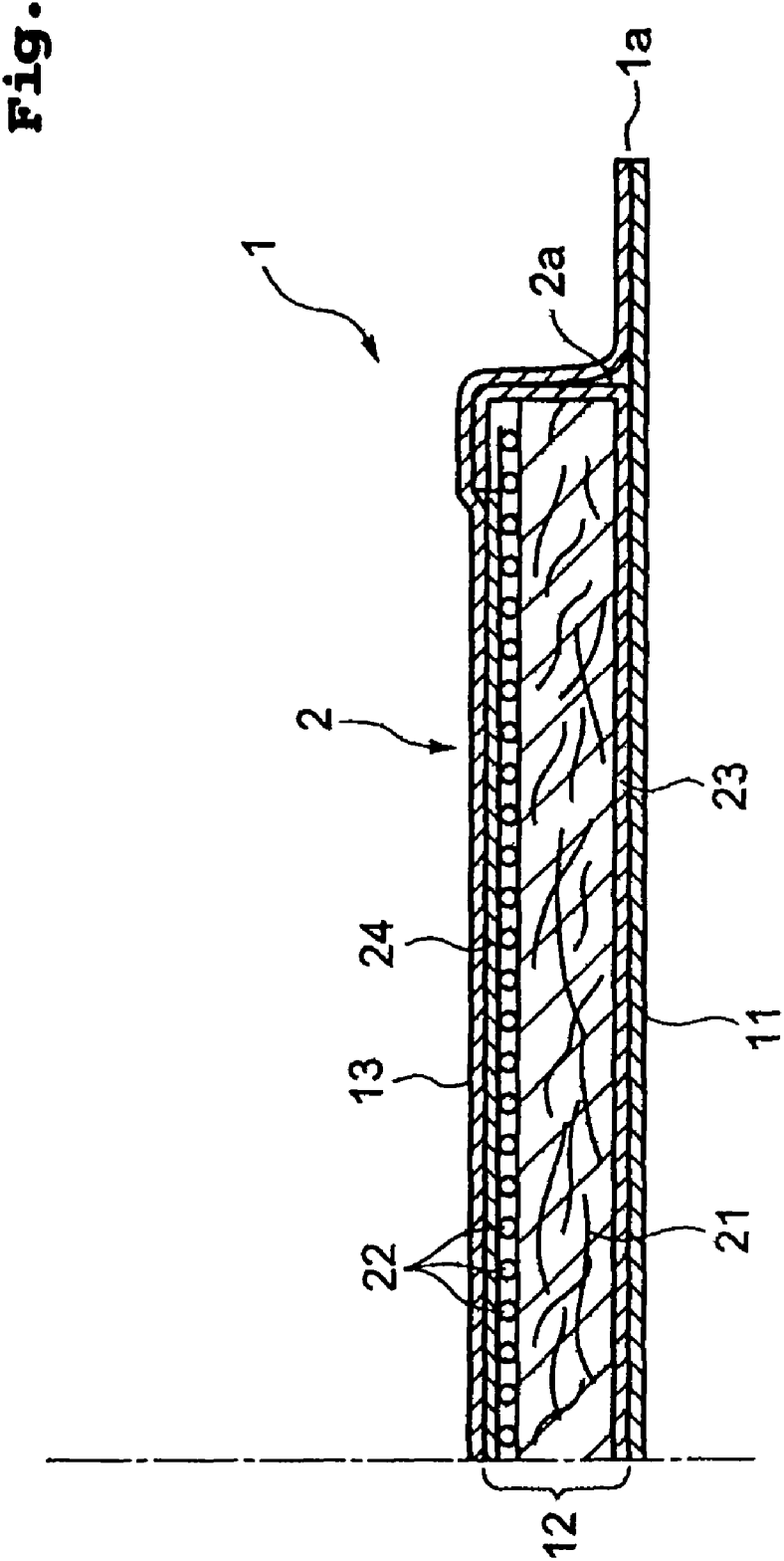

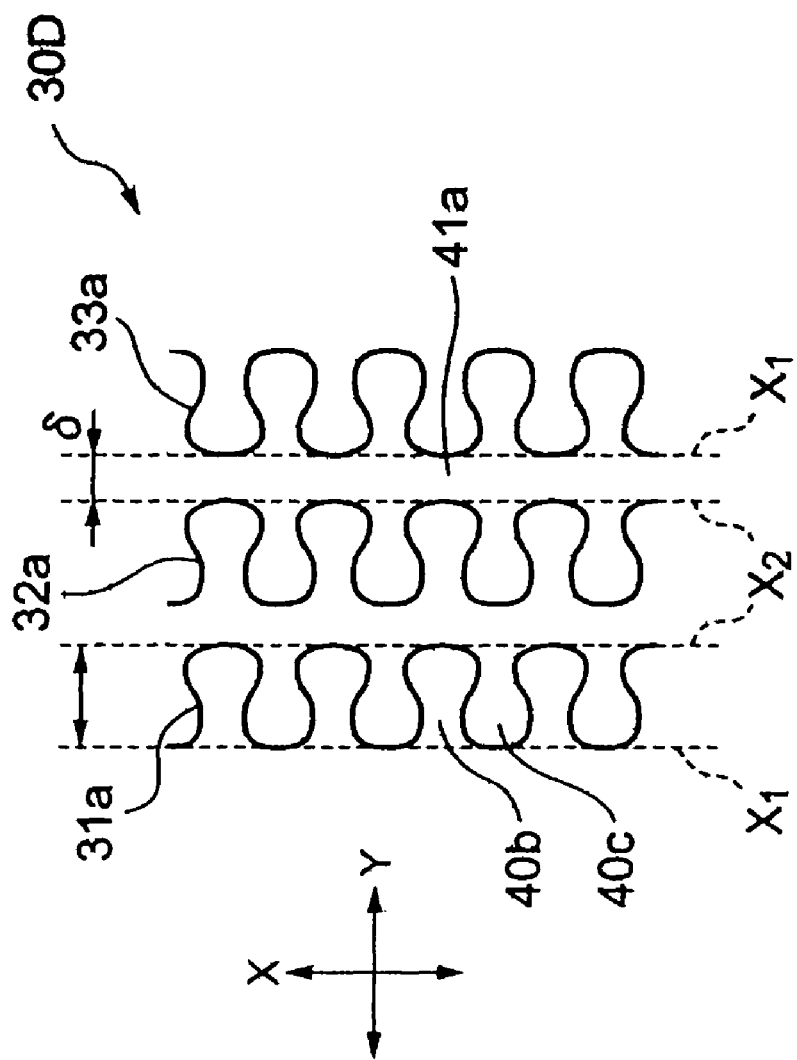
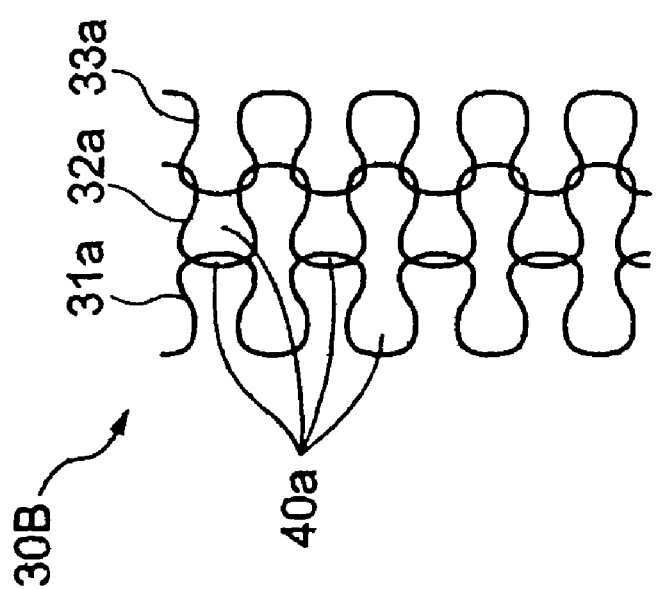

PET WASTE ABSORPTION SHEET

INCORPORATION BY REFERENCE

The present application claims priority under 35 U.S.C. §119 to Japanese Patent Application No. 2005-056423 filed on Mar. 1, 2005 in the Japanese language, which is hereby incorporated by reference in its entirety.

BACKGROUND OF THE INVENTION

1. Field of the Invention

The present invention relates to a pet waste absorption sheet intended to be spread on a floor, a bottom face of a tray-type pet toilet, or the like.

2. Description of the Related Art

Typically, pet waste absorption sheets have a liquid-impermeable backsheet on a lower surface side, a liquid-permeable topsheet on an upper surface side, and an absorbent core disposed between the backsheet and the topsheet. Such pet waste absorption sheets are intended to be spread on a floor or the like with the lower surface directed downward, so that pets can step on the upper surface of the pet waste absorption sheet.

In a pet mat disclosed in Japanese Unexamined Patent Application Publication No. 2004-187597, the backsheet is a nonwoven fabric laminated with a waterproof film. The absorbent core, which lies on the backsheet, is a pulp layer covered with water absorbent polymer and further wrapped in a carrier tissue. The topsheet, which covers the upper surface of the absorbent core, is a nonwoven fabric that is bonded to the absorbent core by melting a hot-melt sheet interposed between the nonwoven fabric and the absorbent core.

Since the topsheet of JP2004-187597 is a nonwoven fabric, pet claws are liable to catch in fibers of the nonwoven fabric. This may cause a problem that the pet mat will be moved out of position by motion of the pet. In addition, the nonwoven fabric is unsuitable for the topsheet, because the nonwoven fabric tends to feel wet after absorption of urine discharged from the pet.

In pet mats of this type, the topsheet and the absorbent core are preferably bonded to and kept in contact with each other so that liquid applied to the topsheet can readily migrate to the absorbent core. In JP2004-187597, therefore, the topsheet and the absorbent core are bonded to each other by melting the hot-melt sheet. However, this hot-melt tends to interfere with migration of liquid from the topsheet to the absorbent core, which results in leaving urine on the topsheet.

Alternatively, the topsheet and the absorbent core may be bonded to each other by spraying a hot-melt type adhesive over the topsheet or the absorbent core. In this case, however, the adhesive after curing takes the form of fibers and prevents passage of liquid through the nonwoven fabric, which interferes with migration of urine from the topsheet to the absorbent core.

SUMMARY OF THE INVENTION

The present invention has been developed to solve the problems in the prior art set forth above and has an object to provide a pet waste absorption sheet which permits liquid such as urine to readily migrate from a topsheet to an absorbent core, thereby preventing liquid from leaving on the topsheet.

According to the present invention, there is provided a pet waste absorption sheet comprising a liquid-impermeable backsheet, a liquid-permeable topsheet, and an absorbent core disposed between the backsheet and the topsheet, the topsheet being a resin film formed with a plurality of apertures for passage of liquid, the topsheet being bonded to the absorbent core through a hot-melt type adhesive, the hot-melt type adhesive being applied in a plurality of continuous lines including curved portions.

In the present invention, since the topsheet is such an apertured resin film, the upper surface of the pet waste absorption sheet is effectively prevented from feeling wet and giving an unpleasant feeling to pets. In addition, since the topsheet and the absorbent core are kept in contact with each other by bonding, liquid such as urine applied to the topsheet can readily pass through the apertures and migrate to the absorbent core. Furthermore, the hot-melt type adhesive applied in the continuous lines reduces the possibility of blocking the apertures, as compared with the conventional case where a hot-melt sheet is melted between the topsheet and the absorbent core or a hot-melt type adhesive is sprayed over the topsheet or the absorbent core and takes the form of fibers after curing. Therefore, liquid such as urine applied to the topsheet can be quickly absorbed in the absorbent core. Preferably, the continuous lines are spiral or wavy lines.

Preferably, areas bounded by the continuous lines have a larger average than opening areas of the apertures and are, for example, in the range of 2 to 100 mm$^2$. If the areas bounded by the continuous lines are within the above range, the continuous lines of the hot-melt type adhesive are effectively prevented from crossing all the apertures, increasing the number of apertures which do not lie on the continuous lines. Accordingly, liquid having passed through the apertures of the topsheet can be quickly absorbed in the absorbent core, preventing liquid from being left on the topsheet. The bonding through the hot-melt type adhesive applied in the continuous lines increases the contact between the topsheet and the absorbent core.

The continuous lines (e.g., spiral or wavy lines) of the hot-melt type adhesive may intersect with each other. If the continuous lines are spaced apart, on the other hand, a distance between adjacent continuous lines is preferably at most 10 mm so as to maintain the contact between the topsheet and the absorbent core.

Preferably, areas bounded by the continuous lines are arranged at a larger pitch than the apertures in an extension direction of the continuous lines, and the continuous lines are arranged at a larger pitch than the apertures in a direction perpendicular to the extension direction. If so, the continuous lines of the hot-melt type adhesive are effectively prevented from crossing all the apertures, increasing the number of apertures which do not lie on the continuous lines. Thus, liquid can readily migrate from the topsheet to the absorbent core.

Preferably, the continuous lines have a width that is smaller than an opening diameter of the apertures. In this case, even if the continuous lines of the hot-melt type adhesive cross the apertures, the apertures are prevented from being completely blocked by the continuous lines, ensuring passage of liquid through the apertures.

Preferably, a hydrophilic sheet for diffusing liquid is disposed on the absorbent core and secured to the topsheet through the hot-melt type adhesive. With the hydrophilic sheet secured to the topsheet, liquid having passed through the apertures of the topsheet is effectively preventing from being left on the topsheet sheet or within the apertures of the topsheet due to immediate diffusion through the hydrophilic sheet.

Preferably, when 0.1 cc of saline solution is dropped from 50 mm above the hydrophilic sheet, which is held horizontal in the air, and allowed to stand for 30 seconds, the saline solution has a diffusion diameter of 30 mm or more.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only.

In the drawings:

FIG. 1 shows a plan view of a pet waste absorption sheet according to one embodiment of the present invention;

FIG. 2 is a half sectional view taken along line II-II of FIG. 1;

FIGS. 4(A), 4(B) show application patterns of a hot-melt type adhesive;

FIGS. 5(A), 5(B) are schematic diagrams showing a positional relationship between apertures of a topsheet and an application pattern of a hot-melt type adhesive on.

DESCRIPTION OF THE PREFERRED EMBODIMENT

Figure 3A:
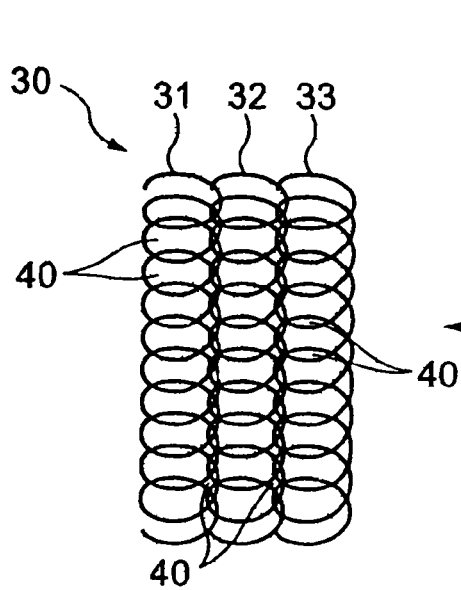
FIGS. 3(A), 3(B) show application patterns of a hot-melt type adhesive.

The present invention will be discussed hereinafter in detail in terms of the preferred embodiment according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscuring of the present invention.

FIG. 1 shows a plan view of a pet waste absorption sheet 1 according to one embodiment of the present invention, and FIG. 2 is a half sectional view taken along line II-II of FIG. 1. FIGS. 3(A), 3(B) and FIGS. 4(A), 4(B) show application patterns of a hot-melt type adhesive. FIGS. 5(A), 5(B) and FIGS. 6(A), 6(B) are schematic diagrams showing a positional relationship between apertures of a topsheet and an application pattern of a hot-melt type adhesive.

The pet waste absorption sheet 1 shown in FIG. 1 is of a rectangular shape having a pair of long sides 1a and a pair of short sides 1b. The long side 1a may extend 300 to 1,200 mm along an X-direction; the short side 1b may extend 200 to 900 mm along a Y-direction. The size of the pet waste absorption sheet 1 is not limited to the above range but may vary depending on the type of pet.

The pet waste absorption sheet 1 centrally has an absorbent region 2. The absorbent region 2 is also of a rectangular shape having a pair of long sides 2a and a pair of short sides 2b. Between the long sides 1a, 2a and between the short sides 1b, 2b, there is provided a peripheral region having a width of about 10 to 50 mm.

In the sectional view of FIG. 2, the pet waste absorption sheet 1 is depicted thicker than it really is for the sake of clarity. Individual components of the pet waste absorption sheet 1 have upper and lower surfaces. As used herein, the term "upper surface" refers to one surface intended to receive liquid discharged from a pet, and the term "lower surface" refers to the other surface intended to face a floor or the like.

As shown in the sectional view of FIG. 2, the pet waste absorption sheet 1 includes a liquid-impermeable backsheet 11, an absorbent core 12 laid on the backsheet 11, and a liquid-permeable topsheet 13 covering the upper surface of the absorbent core 12. The absorbent region 2 refers to an area where the absorbent core 12 is present. Between the long sides 1a, 2a and between the short sides 1b, 2b, the backsheet 11 and the topsheet 13 are directly bonded to each other without interposing the absorbent core 12. If desired, a thin absorbent sheet such as hydrophilic paper may be interposed between the backsheet 11 and the topsheet 13 outside the absorbent region 2 to ensure a certain degree of liquid absorption in the peripheral region.

The backsheet 11 may be a resin film such as of polyethylene resin.

The absorbent core 12 may comprise an absorbent material layer 21 constructed by mixing superabsorbent polymer (SAP) in fluff pulp (or comminuted pulp), superabsorbent polymer (SAP) 22 distributed over the upper surface of the absorbent material layer 21, and hydrophilic papers (or hydrophilic sheets) 23, 24 wrapped around the absorbent material layer 21 and the superabsorbent polymer 22. In the absorbent core 12, the hydrophilic paper 23 covers the lower surface and side surfaces along the long sides 2a, and the hydrophilic paper 24 covers the upper surface.

In the absorbent core 12, the fluff pulp may have a basis weight of about 50 to 200 $g/m^2$, and the superabsorbent polymer may be distributed in an amount of about 15 to 100 $g/m^2$. The hydrophilic papers 23, 24 may be tissue made of pulp, which is hydrophilic fibers, and having a basis weight of about 10 to 20 $g/m^2$. Here, the hydrophilic paper 24 covering the upper surface of the absorbent core 12 is intended to diffuse liquid such as urine. The hydrophilic paper 24 may be replaced by a thin nonwoven fabric made of hydrophilic fibers such as pulp and regenerated cellulose fibers.

The hydrophilic paper 24 should be highly effective in diffusing liquid. The effect of diffusing liquid may be measured as follows. The hydrophilic paper 24, to which no hot-melt type adhesive is applied, is placed on an opening of a cylinder having an inner diameter of 100 mm with its peripheral portion being fixed around the cylinder such as by a rubber band. Thus, the hydrophilic paper 24 is held flat and horizontal in the air. By using a micropipette, 0.1 cc of saline solution is dropped from 50 mm above the center of the hydrophilic paper 24, which is held flat within the opening of the cylinder. 30 seconds after dropping, the saline solution preferably has a diffusion diameter of 30 mm or more on the hydrophilic paper 24.

For the superabsorbent polymer contained in the absorbent material layer 21 and the superabsorbent polymer 22 distributed over the upper surface of the absorbent material layer 21, there may be used cross-linked sodium polyacrylate, copolymer of sodium polyacrylate and starch, or copolymer of polyacrylonitrile and cellulose. These polymers may be in a granular form.

The topsheet 13 may be a resin film such as of polyethylene resin. The resin film is formed with a large number of apertures 15 for passage of liquid, as shown in FIGS. 5 and 6 schematically on an enlarged scale. The resin film may have a basis weight of about 10 to 40 $g/m^2$. The apertures 15 may be formed by a perforation method such that the resin is softened by heating and sucked through a perforated plate. As shown in FIGS. 5 and 6, the apertures 15 have a circular opening. Alternatively, the opening may be of an oval or polygonal shape. The individual apertures 15 may have an opening diameter of 0.4 to 1.2 mm and an opening area of about 0.12 to 1.13 mm². The resin film may have a percent open area of 20 to 60%, preferably 30 to 50%.

The upper surface of the resin film used for the topsheet 13 is preferably treated to be hydrophilic. Such hydrophilic treatment reduces surface tension of the upper surface, ensuring that liquid applied to the topsheet 13 will quickly pass through the apertures 15 due to hydrophilicity of the absorbent core 12.

The hydrophilic paper 24 covering the upper surface of the absorbent core 12 is almost entirely secured to the topsheet 13 through an adhesive. The adhesive is of a hot-melt type and may be applied to the lower surface of the topsheet 13 by a coater. Alternatively, the hot-melt type adhesive may be applied to the upper surface of the hydrophilic paper 24. Since the hydrophilic paper 24, which is the uppermost layer of the absorbent core 12, is bonded to and kept in contact with the topsheet 13, liquid such as urine applied to the apertures 15 of the topsheet 13 can be immediately absorbed and diffused by the underlying hydrophilic paper 24.

FIG. 3(A) shows a part of an application pattern 30 of the hot-melt type adhesive on an enlarged scale.

As shown in FIG. 3(A), the application pattern 30 is obtained by applying the hot-melt type adhesive in a number of continuous lines. In FIG. 3(A), 3(B) and FIGS. 4(A), 4(B), only three continuous lines are depicted for the sake of clarity, but it should be understood that the actual number of the continuous lines is large. Individual continuous lines 31, 32, 33 of the application pattern 30 extend continuously in the X-direction, which is a workpiece feed direction (or machine direction: MD) in the manufacturing process of the pet waste absorption sheet 1. The individual continuous lines 31, 32, 33 may have a width of 0.1 to 1.2 mm. The line width is preferably smaller than the opening diameter of the apertures 15 shown in FIGS. 5 and 6.

In the application pattern 30 shown in FIG. 3(A), the individual continuous lines 31, 32, 33 include curved portions. More particularly, the individual continuous lines 31, 32, 33 are continuously curved in the form of a spiral line. Between adjacent continuous lines (e.g., 31 and 32, or 32 and 33), the curved portions intersect with each other. In the area where the hot-melt type adhesive is applied, accordingly, a large number of liquid passage areas 40 bounded by the continuous lines of the adhesive are arranged adjacent to each other. The liquid passage areas 40 may be in the range of 2 to 100 mm² and are preferably larger than the opening areas of the apertures 15.

If the smallest ones of the liquid passage areas 40 are at least 2 mm² or the liquid passage areas 40 have an average of at least 2 mm² and preferably the liquid passage areas 40 are larger than the opening areas of the apertures 15, the continuous lines of the hot-melt type adhesive are effectively prevented from crossing all the apertures 15, increasing the number of apertures 15 which do not lie on the continuous lines. In addition, even if the continuous lines of the hot-melt type adhesive cross the apertures 15, the curvature of the continuous lines reduces the possibility of completely blocking the apertures 15. Thus, liquid can readily migrate from the topsheet 13 to the absorbent core 12.

In the present embodiment, as set forth above, it is preferred that the smallest ones of the liquid passage areas 40 are larger than the opening areas of the apertures 15 or that the liquid passage areas 40 have a larger average than the opening areas of the apertures 15.

If the liquid passage areas 40 exceed 100 mm², the contact between the hydrophilic paper 24 and the topsheet 13 may decrease to create a space between the absorbent core 12 and the topsheet 13. This will lower the ability of the absorbent core 12 to draw in liquid such as urine applied to the upper surface of the topsheet 13.

Figure 3B:
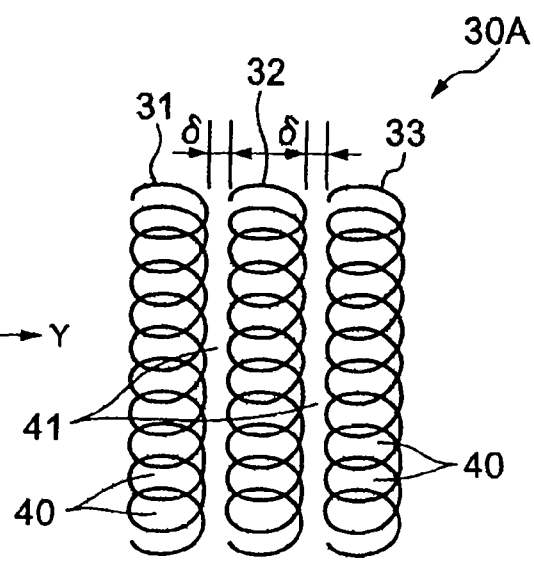

FIG. 3(B) shows an application pattern 30A where the spiral continuous lines 31, 32, 33 are spaced apart in the Y-direction to leave spaces 41. Here, a distance δ between adjacent continuous lines is preferably at most 10 mm, more preferably at most 5 mm. The distance δ may be either an average distance between adjacent continuous lines or a minimum distance between adjacent continuous lines. If the distance δ falls within the above range, the contact between the topsheet 13 and the absorbent core 12 is effectively prevented from decreasing at the spaces 41.

Furthermore, the distance δ between adjacent continuous lines is preferably larger than the opening diameter of the apertures 15 so as to prevent the continuous lines from blocking the apertures 15.

It should be noted that the liquid passage areas 40 of the application pattern 30A shown in FIG. 3(B) are in the same preferred range as those of the application pattern 30 shown in FIG. 3(A).

FIG. 4(A) shows an application pattern 30B of the hot-melt type adhesive where individual continuous lines 31a, 32a, 33a include curved portions. More particularly, the individual continuous lines 31a, 32a, 33a are continuously curved in the form of a wavy line. Each wave of the wavy continuous line takes the shape of Ω to increase the width in the X-direction (or in the traveling direction of the wave) with approaching the peak in the Y-direction (or in the oscillating direction of the wave). In the application pattern 30B shown in FIG. 4(A), the curved portions intersect with each other between adjacent continuous lines (e.g., 31a and 32a, or 32a and 33a). In the area where the hot-melt type adhesive is applied, accordingly, a large number of liquid passage areas 40a bounded by the continuous lines are arranged adjacent to each other. The liquid passage areas 40a are in the same preferred range as the liquid passage areas 40 shown in FIG. 3(A).

FIG. 4(B) shows an application pattern 30D of the hot-melt type adhesive where the wavy continuous lines 31a, 32a, 33a are spaced apart in the Y-direction without intersecting with each other. Here, X1 and X2 represent average tangent lines extending in the X-direction on both sides of each wavy continuous line and coinciding with the mean position of the peaks on the Y-coordinate axis. Liquid passage areas 40b are bounded by each wavy continuous line and its average tangent line X1; liquid passage areas 40c are bounded by each wavy continuous line and its average tangent line X2. The liquid passage areas 40b, 40c are in the same preferred range as the liquid passage areas 40 shown in FIG. 3(A).

Between adjacent wavy continuous lines (e.g., 31a and 32a, or 32a and 33a), furthermore, spaces 41a are defined by the average tangent lines X1 and X2. The spaces 41a are substantially free of the hot-melt type adhesive. The distance δ between adjacent wavy continuous lines, i.e. between the average tangent lines X1 and X2 is in the same preferred range as the distance δ shown in FIG. 3(B).

Figure 5A:
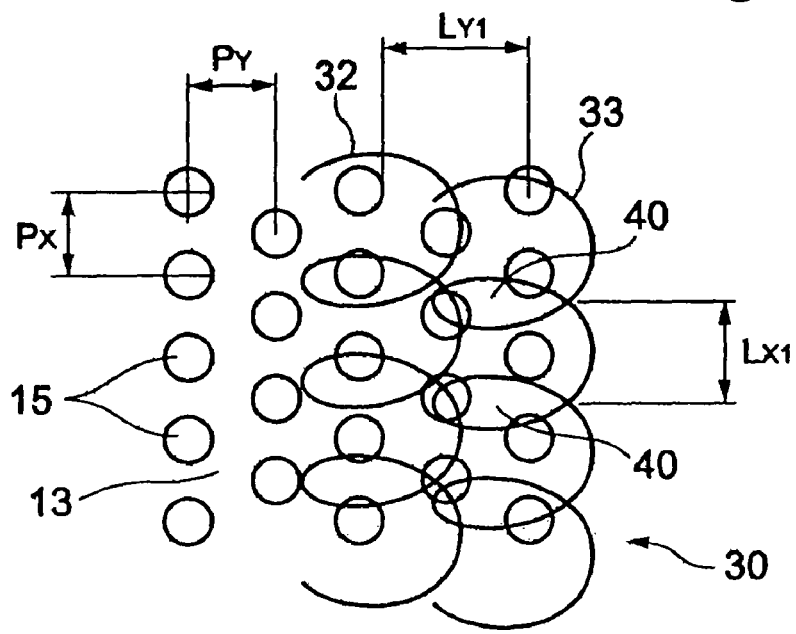

FIG. 5(A) is a schematic diagram showing a positional relationship between the apertures 15 of the topsheet 13 and the spiral application pattern 30 on an enlarged scale.

In FIG. 5(A), the apertures 15 are arranged at a pitch Px in the X-direction and at a pitch Py in the Y-direction. On the other hand, the continuous lines are arranged at a pitch Ly1 in the Y-direction and the liquid passage areas 40 of each continuous line are arranged at a pitch Lx1 in the X-direction. Here, since the pitch Lx1 is not equal to but larger than the pitch Px and the pitch Ly1 is not equal to but larger than the pitch Py, the possibility that the continuous lines cross the apertures 15 can be reduced.

Figure 5B:
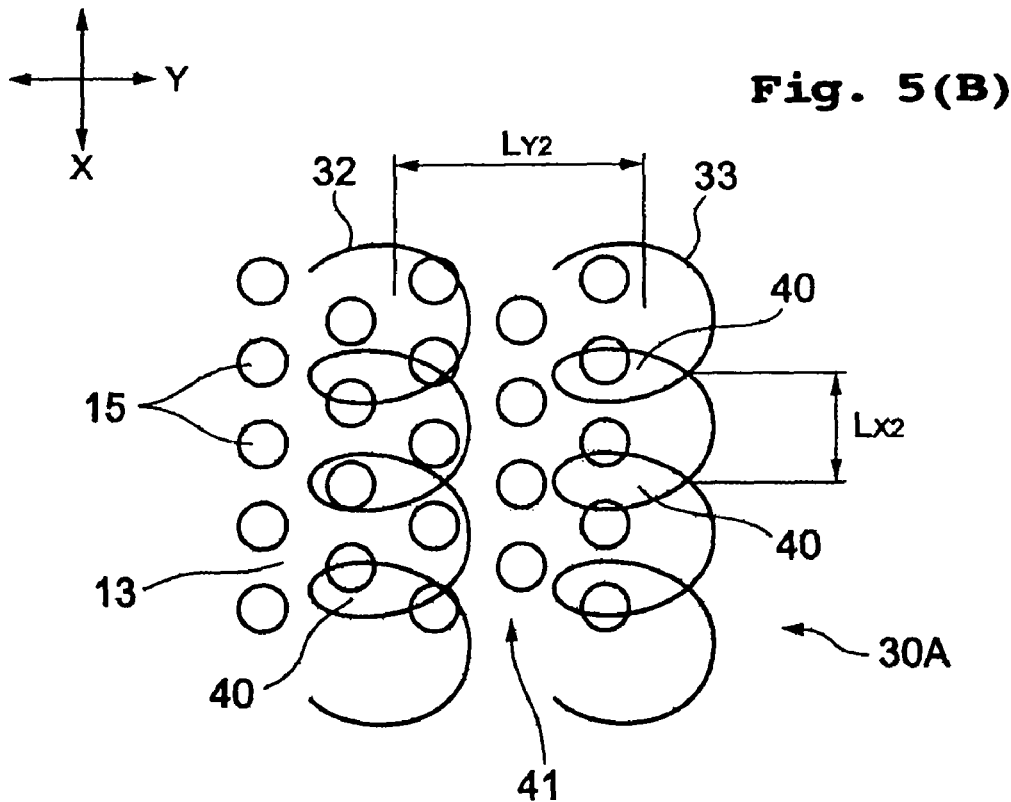

FIG. 5(B) is a schematic diagram showing a positional relationship between the apertures 15 of the topsheet 13 and the spiral application pattern 30A on an enlarged scale.

In FIG. 5(B), the continuous lines are arranged at a pitch Ly2 in the Y-direction and the liquid passage areas 40 of each continuous line are arranged at a pitch Lx2 in the X-direction. Here, the pitch Lx2 is not equal to but larger than the pitch Px and the pitch Ly2 is not equal to but larger than the pitch Py. Moreover, the continuous lines do not intersect with each other and the spaces 41 are left between the continuous lines. This further reduces the possibility that the continuous lines cross the apertures 15.

Figure 6A:
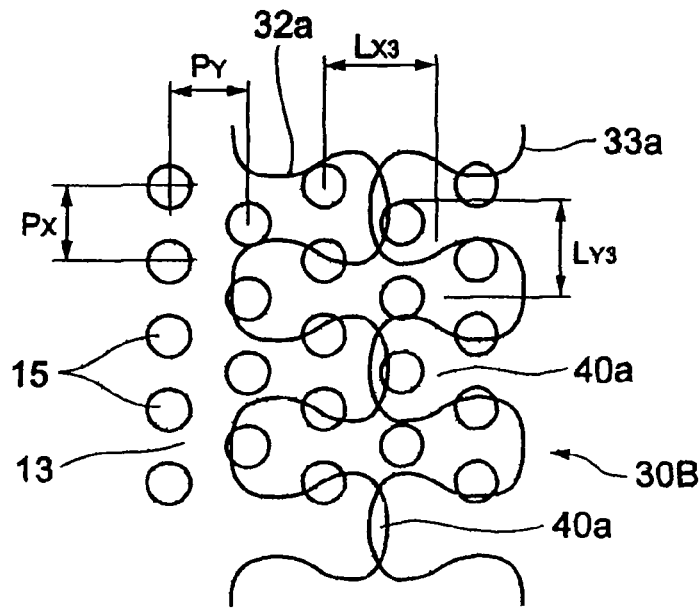
FIGS. 6(A), 6(B) are schematic diagrams showing a positional relationship between apertures of a topsheet and an application pattern of a hot-melt type adhesive.

FIG. 6(A) is a schematic diagram showing a positional relationship between the apertures 15 of the topsheet 13 and the wavy application pattern 30B on an enlarged scale.

In FIG. 6(A), the continuous lines are arranged at a pitch Ly3 in the Y-direction and the liquid passage areas 40a of each continuous line are arranged at a pitch Lx3 in the X-direction. Here, since the pitch Lx3 is not equal to but larger than the pitch Px and the pitch Ly3 is not equal to but larger than the pitch Py, the possibility that the continuous lines cross the apertures 15 can be reduced.

Figure 6B:
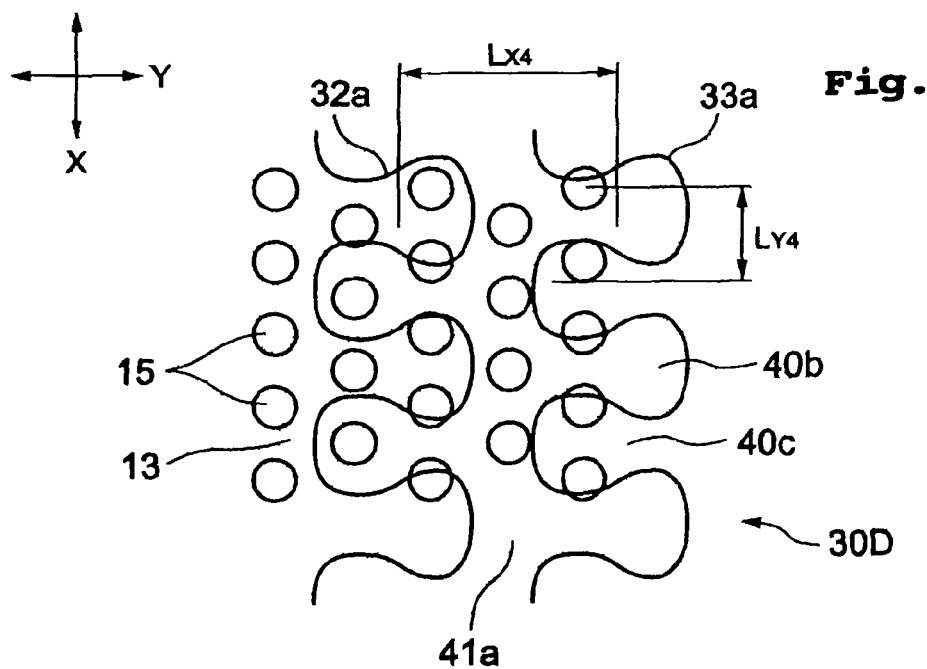

FIG. 6(B) is a schematic diagram showing a positional relationship between the apertures 15 of the topsheet 13 and the wavy application pattern 30D on an enlarged scale.

In FIG. 6(B), the continuous lines are arranged at a pitch Ly4 in the Y-direction and the liquid passage areas 40b, 40c of each continuous line are arranged at a pitch Lx4 in the X-direction. Here, the pitch Lx4 is not equal to but larger than the pitch Px and the pitch Ly4 is not equal to but larger than the pitch Py. Moreover, the continuous lines do not intersect with each other and the spaces 41a are left between the continuous lines. This further reduces the possibility that the continuous lines cross the apertures 15.

The pet waste absorption sheet 1 of this construction is intended to be spread on a floor or a bottom face of a tray-type pet toilet. When pets such as cats and dogs step on the topsheet 13 and discharge urine, since the lower surface of the topsheet 13 is in contact with the hydrophilic paper 24 of the absorbent core 12, the urine applied to the topsheet 13 can be immediately absorbed by the underlying hydrophilic paper 24 through the apertures 15.

The application patterns 30, 30A, 30B, 30D of the hot-melt type adhesive are effective in keeping the contact between the topsheet 13 and the hydrophilic paper 24 and preventing the hot-melt type adhesive from extremely blocking passage of urine. The urine can be diffused in the hydrophilic paper 24 and then absorbed by the superabsorbent polymer 22 and the absorbent material layer 21.

Here, since the topsheet 13 is an apertured resin film, the urine applied to the upper surface of the topsheet 13 can immediately migrate to the absorbent core 12 through the apertures 15, which prevents the urine from being left on the topsheet 13.

It should be noted that the absorbent core 12 is not limited to the SAP-containing fluff pulp layer wrapped in the hydrophilic papers 23, 24. For example, the absorbent core 12 may be a so-called air-laid pulp manufactured by depositing pulp, adding a binder, and pressing them to bond the pulp. In this case, the topsheet 13 may be bonded to the air-laid pulp through the hot-melt type adhesive.

Although the present invention has been illustrated and described with respect to exemplary embodiments thereof, it should be understood by those skilled in the art that the foregoing and various other changes, omission and additions may be made therein and thereto, without departing from the spirit and scope of the present invention. Therefore, the present invention should not be understood as limited to the specific embodiments set out above but should be understood to include all possible embodiments which can be embodied within a scope encompassed and equivalent thereof with respect to the feature set out in the appended claims.

What is claimed is:

1. A pet waste absorption sheet comprising a liquid-impermeable backsheet,
a liquid-permeable topsheet having a hydrophilic outer surface, and
an absorbent core disposed between the backsheet and the topsheet,
the top sheet being a resin film formed with a plurality of apertures for passage of liquid, the topsheet being bonded to the absorbent core through a hot-melt type adhesive, the hot-melt type adhesive being applied in a plurality of continuous lines including curved portions,
wherein liquid passage areas defined between the curved portions of the continuous lines and tangent lines defining a lateral extent of the continuous lines have larger average areas than liquid passage areas defined by the apertures,
wherein the continuous lines are wavy lines and each continuous wavy line has a continuous pattern of connected Ω-shapes which Ω-shapes can overlap one another, but are otherwise each formed by non-overlapping portions of the continuous lines, and
wherein the liquid passage areas defined by the continuous lines are arranged at a pitch in an extension direction of the continuous lines that is larger than a pitch of the apertures in an extension direction, and are further arranged at a pitch in a direction perpendicular to the extension direction that is larger than a pitch of the apertures in the direction perpendicular to the extension direction.

2. The pet waste absorption sheet of claim 1, wherein the liquid passage areas defined by the continuous lines are in the range of 2 to 100 mm.

3. The pet waste absorption sheet of claim 1, wherein the continuous lines are spaced apart by a distance of at most 10 mm.

4. The pet waste absorption sheet of claim 1, wherein the continuous lines have a line width that is smaller than an opening diameter of the apertures.

5. The pet waste absorption sheet of claim 1, wherein a hydrophilic sheet for diffusing liquid is disposed on the absorbent core and secured to the top sheet through the hot-melt type adhesive.

6. The pet waste absorption sheet of claim 5, wherein when 0.1 cc of saline solution is dropped from 50 mm above the hydrophilic sheet, which is held horizontal in the air, and allowed to stand for 30 seconds, the saline solution has a diffusion diameter of 30 mm or more.

* * * * *